United States Patent Office 3,689,327
Patented Sept. 5, 1972

3,689,327
SOLDERING FLUX
Theodore Boyme, Chicago, Ill., assignor to National Can Corporation, Chicago, Ill.
No Drawing. Filed Nov. 23, 1970, Ser. No. 92,292
Int. Cl. B23k *35/34, 35/36*
U.S. Cl. 148—23                              7 Claims

ABSTRACT OF THE DISCLOSURE

A flux is provided for soldering tin plate and particularly for soldering the side seams of cans for the storage of food. The flux comprises isophthalic acid and an amine hydrobromide in a dimethylformamide solvent.

BRIEF DESCRIPTION OF THE INVENTION

Containers, or cans, made of tin plate soldered to itself to a cylindrical shape are widely used for the storage of food. In order to achieve a firm, hermetically sealed, solder bond in the soldering of the side seams of tin plate containers it is necessary to utilize a flux during the soldering operation to remove dirt, oils, oxides and other corrosion products from the metal surfaces so that the solder will wet the metal surfaces, fill any voids and produce a strong solder bond between the surfaces.

Rosins were at one time widely used as fluxes in the soldering of tin plate but they tend to discolor badly during the soldering operation, leaving an unsightly joint. A flux system which has recently come into use to replace rosin comprises an organic polycarboxylic acid, such as sebacic acid, together with monoethanolamine hydrochloride, as an activator, and dimethylformamide as a solvent for the system. More recently, it has been found that one of the most effective polycarboxylic acids for use in solder fluxes is isophthalic acid.

In accordance with the present invention it has been found that in solder flux compositions utilizing isophthalic acid as the organic polycarboxylic acid, amine hydrobromides, and particularly triethylamine hydrobromide, are superior to monoethanolamine hydrochloride as flux activators.

The ultimate test of any flux is its performance in the production line and the reliability of the solder bonds produced in its use. However, a useful laboratory test for determining the quality of a soldering flux is the scorch test which provides a measurement of how much a solder disc spreads and how evenly it spreads.

The scorch test is carried out on a Blakeslee Enamel Scorch Tester by placing two drops of flux on a 4 in.$^2$ disc of electrolytic tin plate having a nominal thickness of 0.065 in., and then placing in the flux a solid core form disc of solder, 0.312″ in outer diameter and 0.026″ in thickness. The solder is composed of 2% tin and 98% lead. The supporting disc is then scorched at 710° F. for 2¼ seconds and, upon cooling, the area of solder spread is measured with an Ott planimeter, capable of measuring with a precision of 0.01 in.$^2$.

In the comparison of one flux with another, the superior fluxes are associated with greater solder spreads by the scorch test.

EXAMPLES 1–8

A series of solder fluxes were prepared utilizing isophthalic acid, dimethylformamide and monoethanolamine hydrochloride in a range of acid/activator ratios and a comparable series was prepared substituting triethylamine hydrobromide as the activator in place of the monoethanolamine hydrochloride. The fluxes were tested for solder spread by the scorch test described above and the results were as follows:

| Example | 1 | 2 | 3 | 4 | 5 | 6 | 7 | 8 |
|---|---|---|---|---|---|---|---|---|
| Isophthalic acid (wt.) | 25.00 | 25.00 | 25.00 | 25.00 | 25.00 | 25.00 | 25.00 | 25.00 |
| Dimethylformamide (wt.) | 74.50 | 73.75 | 72.50 | 70.00 | 74.50 | 73.75 | 72.50 | 70.00 |
| Monoethanolamine hydrochloride (wt.) | 0.50 | 1.25 | 2.50 | 5.00 | | | | |
| Triethylamine hydrobromide (wt.) | | | | | 0.50 | 1.25 | 2.50 | 5.00 |
| Acid/activator ratio | 50 | 20 | 10 | 5 | 50 | 20 | 10 | 5 |
| Solder spread (in.$^2$) | .13 | .15 | .15 | .09 | .10 | .12 | .14 | .22 |

Comparison of the isophthalic acid-monoethanolamine hydrochloride system with the isophthalic acid-triethylamine hydrobromide system in the above data shows the greatest difference at the lowest acid/activator ratios where it might be expected that the effect of the activator would be most pronounced. In the case of the monoethanolamine hydrochloride there is a sharp drop in effectiveness as the acid/activator ratio drops to 5 in contrast to a sharp rise at similar acid/activator values in the triethylamine hydrobromide system.

The acid/activator ratios of the flux compositions of this invention may vary suitably from about 1 to about 50, with lower values producing the maximum effect of the activator. The optimum range of acid/activator ratios is from about 2 to about 10.

The total solids content (acid plus activator) of the composition may vary suitably from about 1 to about 30 wt. percent, with a preferable range being from about 4 to about 15 wt. percent and the optimum range being from about 6 to about 10 wt. percent. Because of the limited solubility of triethylamine hydrobromide in dimethylformamide (about 2½ wt. percent at room temperature), high solids contents and low acid/actviator ratios cannot be employed simultaneously since it is desired that the system be in solution.

A typical flux composition within the optimum ranges comprises 4.44 wt. percent of isophthalic acid, 1.56 wt. percent of triethylamine hydrobromide, and 94 wt. percent of dimethylformamide.

While the invention, in its specific embodiments, has been described with reference to triethylamine hydrobromide, it is to be understood that other amine hydrobromides, such as triethanolamine hydrobromide, may also be used.

If desired, other components may be included in the solder flux of this invention, provided that they are compatible with the isophthalic acid, amine hydrobromide and dimethylformamide. Stannous chloride, for example, may be included as a component of the flux in proportions from about 0.4 to 0.8% by weight.

Other modifications within the scope of this invention will be apparent to those skilled in the art.

I claim:

1. A solder flux composition comprising isophthalic acid, an amine hydrobromide activator and dimethylformamide, said isophthalic acid and said amine hydrobromide together comprising from about 1 to about 30 wt. percent of the total composition and the weight ratio of isophthalic acid to amine hydrobromide being from about 1 to about 50.

2. The composition of claim 1 wherein said amine hydrobromide is triethanolamine hydrobromide.

3. The composition of claim 1 wherein said amine hydrobromide is triethylamine hydrobromide.

4. The composition of claim 3 wherein said composition contains from about 0.4 to about 0.8 wt. percent of stannous chloride.

5. The composition of claim 3 wherein said isophthalic acid and said triethylamine hydrobromide together comprise from about 4 to about 15 wt. percent of said composition and the weight ratio of isophthalic acid to triethylamine hydrobromide is from about 2 to about 10.

6. The composition of claim 5 wherein said triethylamine hydrobromide is present in an amount not exceeding 2½ wt. percent.

7. A composition comprising about 4.44 wt. percent of isophthalic acid, about 1.56 wt. percent of triethylamine hydrobromide, and about 94 wt. percent of dimethylformamide.

References Cited

UNITED STATES PATENTS

| | | | |
|---|---|---|---|
| 3,235,414 | 2/1966 | Marks | 148—23 |
| 2,978,369 | 4/1961 | Battle et al. | 148—23 |
| 2,880,126 | 3/1959 | Jordan et al. | 148—23 |
| 2,895,862 | 7/1959 | Laudenslager | 148—23 |
| 2,482,923 | 9/1949 | McCoy | 148—23 |
| 2,563,391 | 8/1951 | Browne | 148—23 |
| 1,949,916 | 3/1934 | McQuaid | 148—23 |

GEORGE T. OZAKI, Primary Examiner

U.S. Cl. X.R.

148—24